(12) United States Patent
Fujita et al.

(10) Patent No.: US 9,785,042 B2
(45) Date of Patent: Oct. 10, 2017

(54) VEHICULAR LIGHTING APPARATUS

(71) Applicant: TOYOTA JIDOSHA KABUSHIKI KAISHA, Toyota-shi, Aichi-ken (JP)

(72) Inventors: Kazuyuki Fujita, Gotenba (JP); Shinya Kawamata, Mishima (JP); Shinichi Nagata, Yokohama (JP); Minami Sato, Ebina (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/430,624

(22) Filed: Feb. 13, 2017

(65) Prior Publication Data

US 2017/0255093 A1 Sep. 7, 2017

(30) Foreign Application Priority Data

Mar. 7, 2016 (JP) .................. 2016-043539

(51) Int. Cl.
| | |
|---|---|
| *B60Q 1/52* | (2006.01) |
| *G03B 21/26* | (2006.01) |
| *B60Q 1/50* | (2006.01) |
| *G01S 13/93* | (2006.01) |
| *G01S 7/24* | (2006.01) |
| *H04N 7/18* | (2006.01) |
| *G06K 9/00* | (2006.01) |

(52) U.S. Cl.
CPC .............. *G03B 21/26* (2013.01); *B60Q 1/50* (2013.01); *G01S 7/24* (2013.01); *G01S 13/931* (2013.01); *B60Q 2400/50* (2013.01); *G06K 9/00791* (2013.01); *H04N 7/185* (2013.01)

(58) Field of Classification Search
CPC ...... G03B 21/26; B60Q 1/50; B60Q 2400/50; G01S 7/24; G01S 13/931; G06K 9/00791; H04N 7/185
USPC ........ 340/435, 471, 901, 905; 345/7, 8, 156; 701/1, 29, 36, 41, 70, 200, 201, 208
See application file for complete search history.

(56) References Cited

U.S. PATENT DOCUMENTS

| | | |
|---|---|---|
| 7,791,458 B2 | 9/2010 | Shimaoka et al. |
| 2008/0175012 A1 | 7/2008 | Shimaoka et al. |
| 2010/0085181 A1* | 4/2010 | Brooking ............. B60Q 1/2611 340/468 |

(Continued)

FOREIGN PATENT DOCUMENTS

JP 2008-143510 A 6/2008

*Primary Examiner* — Ojiako Nwugo
(74) *Attorney, Agent, or Firm* — Sughrue Mion PLLC

(57) ABSTRACT

A vehicular lighting apparatus is provided with: a detector configured to detect a movable body around a self-vehicle; a deteminator configured to determine whether or not the movable body is an object whose attention is to be called; and a projector configured to project predetermined visual information by using illumination light in a predetermined range around the object if it is determined by the determinator that the movable body is the object. The predetermined visual information includes first information to be presented to a driver of the self-vehicle and second information to be presented to the object. The predetermined visual information is visualized as the first information by the driver of the self-vehicle and is visualized as the second information by the object, depending on a viewpoint difference between the driver of the self-vehicle and the object.

6 Claims, 7 Drawing Sheets

(56) References Cited

U.S. PATENT DOCUMENTS

| | | | | |
|---|---|---|---|---|
| 2010/0253489 A1* | 10/2010 | Cui | .................. | G01S 13/723 340/425.5 |
| 2010/0253493 A1* | 10/2010 | Szczerba | ............... | G01S 13/723 340/435 |
| 2010/0253594 A1* | 10/2010 | Szczerba | ............... | G01S 13/723 345/7 |
| 2011/0273671 A1* | 11/2011 | Chu | .................. | G03B 21/14 353/13 |
| 2016/0207443 A1* | 7/2016 | Widdowson | ......... | B60Q 1/0011 |
| 2016/0216521 A1* | 7/2016 | Yachida | ................ | B60K 35/00 |

* cited by examiner

VEHICULAR LIGHTING APPARATUS

CROSS-REFERENCE TO RELATED APPLICATIONS

This application is based upon and claims the benefit of priority of the prior Japanese Patent Application No. 2016-043539, filed on Mar. 7, 2016, the entire contents of which are incorporated herein by reference.

BACKGROUND OF THE INVENTION

1. Field of the Invention

Embodiments of the present invention relate to a vehicular lighting apparatus configured to apply light around a self-vehicle to call attention.

2. Description of the Related Art

For this type of apparatus, there is known a technology/technique in which light is applied toward an object or target that exists around the self-vehicle, thereby to call the object's attention to approach of the self-vehicle. Moreover, there is also known a technology/technique in which light applied to the object is used to present information to a driver of the self-vehicle. In Japanese Patent Application Laid Open No. 2008-143510, there is proposed a technology/technique in which the same light as the light for calling the object's attention is used to present information about a moving direction of the object and a distance to the self-vehicle, to the driver of the self-vehicle.

In the aforementioned Patent Literature, an illumination pattern in a T shape, Y shape, arrow shape or other shapes is projected on a road surface around the self-vehicle. The illumination pattern aims at informing a driver of information about a pedestrian (specifically, information about a distance to the pedestrian and a direction in which the pedestrian exists). For such a purpose, the illumination pattern does not have a special meaning to the pedestrian. Thus, the pedestrian who walks near the road surface illuminated with the illumination pattern does not recognize that the illumination pattern has a special meaning, and possibly simply recognizes that the road surface is illuminated with light.

As described above, even if the illumination pattern is used to call the object's attention, it is likely meaningless to call the object's attention, unless the object, i.e. the pedestrian or the like, has knowledge regarding the illumination pattern. In other words, even if the object can visualize the T shape, Y shape, or arrow shape illumination pattern, the effect of calling the object's attention cannot be obtained if the object cannot understand the meaning of the patterns.

As described above, even if the self-vehicle projects the illumination pattern by using illumination light, the information cannot be always appropriately presented to the object. In other words, the technology/technique disclosed in the aforementioned Patent Literature has such a technical problem that the information cannot be appropriately presented to each of the driver and the object.

SUMMARY

In view of the aforementioned problems, it is therefore an object of embodiments of the present invention to provide a vehicular lighting apparatus configured to present appropriate information to each of the driver of the self-vehicle and the object by using common illumination light.

<1>

The above object of embodiments of the present invention can be achieved by a vehicular lighting apparatus provide with: a detector configured to detect a movable body around a self-vehicle; a deteminator configured to determine whether or not the movable body is an object whose attention is to be called; and a projector configured to project predetermined visual information by using illumination light in a predetermined range around the object if it is determined by said determinator that the movable body is the object, wherein the predetermined visual information includes first information, which is to be presented to a driver of the self-vehicle, and second information, which is to be presented to the object, and the predetermined visual information is visualized as the first information by the driver of the self-vehicle and is visualized as the second information by the object, depending on a viewpoint difference between the driver of the self-vehicle and the object.

According to the vehicular lighting apparatus in embodiments of the present invention, the predetermined visual information projected by using the illumination light is visualized as the first information by the driver of the self-vehicle, and is visualized as the second information by the object, depending on the viewpoint difference between the driver of the self-vehicle and the object. Thus, different pieces of information, which are to be presented respectively to the self-vehicle and the object, can be desirably presented by using common visual information (in other words, by common illumination light).

<2>

In one aspect of the vehicular lighting apparatus according to embodiments of the present invention, wherein said determinator is configured to determine whether or not the movable body is the object, on the basis of contact possibility between the self-vehicle and the movable body, and surrounding visibility of the movable body.

According to this aspect, it can be determined whether or not the movable body is the object whose attention is to be called.

<3>

In another aspect of the vehicular lighting apparatus according to embodiments of the present invention, wherein said projector is configured to project the predetermined visual information and then to change a position of projection of the predetermined visual information in accordance with movement of the self-vehicle and the object.

According to this aspect, even if the self-vehicle or the object moves after the projection of the predetermined visual information, it is possible to keep projecting the predetermined visual information in an appropriate position.

<4>

In another aspect of the vehicular lighting apparatus according to embodiments of the present invention, wherein the first information is information indicating at least one of presence of the object, an attribute of the object, and a moving direction of the object with respect to the self-vehicle, and the second information is information indicating at least one of presence of the self-vehicle, an approaching direction of the self-vehicle with respect to the object, and call for attention to the self-vehicle.

According to this aspect, the presence of the object, the attribute of the object, and the moving direction of the object can be presented to the driver of the self-vehicle. On the other hand, the presence of the self-vehicle, the approaching direction of the self-vehicle, and the call for attention to the self-vehicle can be presented to the object.

The nature, utility, and further features of this invention will be more clearly apparent from the following detailed description with reference to preferred embodiments of the invention when read in conjunction with the accompanying drawings briefly described below.

DETAILED DESCRIPTION OF THE PREFERRED EMBODIMENTS

A vehicular lighting apparatus according to an embodiment of the present invention will be explained with reference to the drawings.

Hereinafter, a configuration of the vehicular lighting apparatus, operations of the vehicular lighting apparatus, an illumination example to a pedestrian, an illumination example when there is an obstacle, and technical effects achieved by the vehicular lighting apparatus will be explained in order.

<Configuration of Vehicular Lighting Apparatus>

Figure 1:
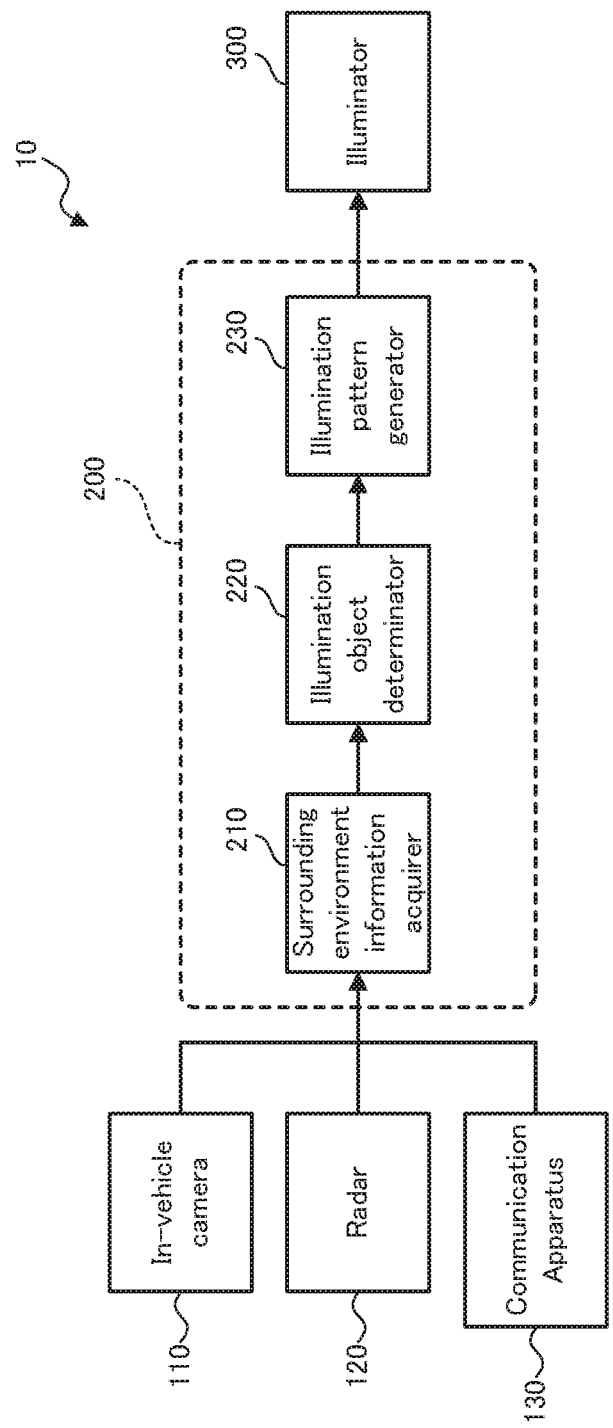
FIG. 1 is a block diagram illustrating a configuration of a vehicular lighting apparatus according to an embodiment.

Firstly, the configuration of the vehicular lighting apparatus according to the embodiment will be explained with reference to FIG. 1. FIG. 1 is a block diagram illustrating the configuration of the vehicular lighting apparatus according to the embodiment.

In FIG. 1, a vehicular lighting apparatus 10 according to the embodiment is mounted on a vehicle, such as an automobile, and is configured to apply light to project a predetermined illumination pattern on a road surface or the like. The "illumination pattern" is one specific example of the "predetermined visual information". The vehicular lighting apparatus 10 is provided with an in-vehicle camera 110, a radar 120, a communication apparatus 130, an ECU 200, and an illuminator 300.

The in-vehicle camera 110 is a camera configured to photograph a front area of the vehicle (in other words, an area corresponding to vision of a driver). The in-vehicle camera 110 may be a camera that uses visible light for photographing, or may be a camera that uses light other than the visible light (e.g. infrared ray, etc.) for photographing. Images photographed by the in-vehicle camera 110 are outputted to a surrounding environment information acquirer 210 as image data.

The radar 120 is a radar configured to recognize a body or object that exists in the front area of the vehicle. The radar 120 is configured to detect a position, a moving speed, or the like of the body that exists around the vehicle, by using a millimeter wave, a laser, or the like. Information about the body detected by the radar 120 is outputted to the surrounding environment information acquirer 210.

The communication apparatus 130 is configured to receive information about the surrounding environment of the vehicle, by wireless communication. Specifically, the communication apparatus 130 is configured to receive information about another vehicle and a pedestrian, by performing vehicle-to-vehicle communication, road-to-vehicle communication, or pedestrian-to-vehicle communication. The communication apparatus 130 may be configured to transmit information about a self-vehicle. The information received by the communication apparatus 130 is outputted to the surrounding environment information acquirer 210.

The ECU 200 is a controller unit having an arithmetic operation circuit, such as a central processing unit (CPU), and is configured to control various operations of the vehicle. The ECU 200 according to the embodiment is particularly configured to perform control for projecting the illumination pattern described later. The ECU 200 is provided with the surrounding environment information acquirer 210, an illumination object determinator 220, and an illumination pattern generator 230, as logical or physical processing blocks realized therein.

The surrounding environment information acquirer 210 is configured to obtain the information respectively outputted from the in-vehicle camera 110, the radar 120, and the communication apparatus 130, as surrounding environment information (i.e. the information about the surrounding environment of the vehicle, particularly, the information about the body that exists around the vehicle). The surrounding environment information obtained by the surrounding environment information acquirer 210 is outputted to the illumination object determinator 220. The surrounding environment information acquirer 210 functions as one specific example of the "detector", together with the in-vehicle camera 110, the radar 120, and the communication apparatus 130.

The illumination object determinator 220 is configured to detect a movable body that exists around the vehicle, by using the surrounding environment information inputted from the surrounding environment information acquirer 210. The "movable body" herein means not only a body that is actually moving, but also a body that has a possibility of moving. For example, even a standing pedestrian and another parking vehicle may be detected as the movable body.

The illumination object determinator 220 is configured to determine whether or not the detected movable body is an object or target. The "object" herein is an object whose attention is to be called by using the illumination pattern. One example of the object is, for example, a pedestrian who is crossing a road ahead on which a self-vehicle is running, a vehicle running on a road crossing the road on which the self-vehicle is running, or the like. Information about the object determined by the illumination object determinator 220 (e.g. information indicating an attribute, a position, a moving direction, a moving speed or the like of the object) is outputted to the illumination pattern generator 230. The illumination object determinator 220 is one specific example of the "determinator".

The illumination pattern generator 230 is configured to generate the illumination pattern including first information, which is to be presented to the driver, and second information, which is to be presented to the object, by using the information about the object inputted from the illumination object determinator 220. The illumination pattern is generated as a pattern that is visualized by the driver of the vehicle as the first information and that is visualized by the object as the second information. The illumination pattern generator 230 is configured to store therein a plurality of illumination patterns corresponding to pairs of the first information and the second information, which are different from each other, and to select an appropriate illumination pattern in accordance with the information about the object. Information indicating the illumination pattern generated by the illumination pattern generator 230 is outputted to the illuminator 300.

The illuminator 300 includes a light (e.g. a headlight of the vehicle, etc.) configured to change a direction and a pattern of light to be applied, and is configured to project the illumination pattern generated by the illumination pattern generator 230 in a predetermined range around the self-vehicle. The "predetermined range" herein is a range in which the illumination pattern projected by the light emitted from the illuminator 300 is clear enough to be recognized by each of the driver of the self-vehicle and the object. The illuminator 300 has a function of changing an illumination position to be an appropriate position, in accordance with movement of the self-vehicle and the object. The illuminator 300 functions as one specific example of the "projector", together with the illumination pattern generator 230.

<Operations of Vehicular Lighting Apparatus>

Figure 2:
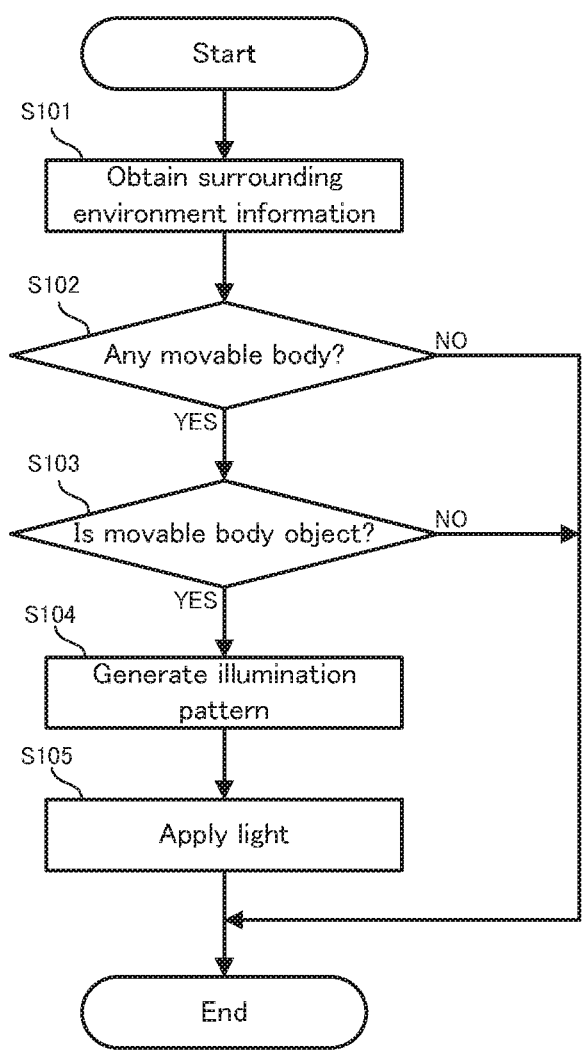
FIG. 2 is a flowchart illustrating a flow of operations of the vehicular lighting apparatus according to the embodiment.

Next, operations of the vehicular lighting apparatus 10 according to the embodiment will be explained in detail with reference to FIG. 2. FIG. 2 is a flowchart illustrating a flow of the operations of the vehicular lighting apparatus according to the embodiment. An operation process illustrated by the flowchart in FIG. 2 is repeatedly performed with a regular or irregular period.

In FIG. 2, in operation of the vehicular lighting apparatus 10 according to the embodiment, firstly, the information detected by the in-vehicle camera 110, the radar 120, and the communication apparatus 130 is obtained by the surrounding environment information acquirer 210 (step S101). The surrounding environment information obtained by the surrounding environment information acquirer 210 is outputted to the illumination object determinator 220.

Then, on the illumination object determinator 220, it is determined whether or not there is a movable body around the self-vehicle (step S102). The illumination object determinator 220 not only determines the presence of the movable body directly from the information detected by the radar 120 and the communication apparatus 130, but also determines the presence of the movable body by analyzing the image data of the images photographed by the in-vehicle camera 110. Alternatively, the illumination object determinator 220 may perform a process for increasing movable body determination accuracy, by using a plurality of pieces of information obtained as the surrounding environment information.

If it is determined on the illumination object determinator 220 that there is no movable body (the step S102: NO), the subsequent process operations are omitted, and a series of process operations is ended. On the other hand, if it is determined that there is the movable body (the step S102: YES), it is determined by the illumination object determinator 220 whether or not the movable body is the object whose attention is to be called (step S103).

In determining whether or not the movable body is the object, firstly, contact possibility with the movable body and surrounding visibility of the movable body are calculated from the surrounding environment information. The "contact possibility" is a value indicating a possibility of contact between the self-vehicle and the movable to body, and is calculated on the basis of a distance, a relative speed, or the like between the self-vehicle and the movable body. Moreover, the "surrounding visibility" is a value indicating visibility around the movable body viewed from the driver of the self-vehicle, or visibility around the movable boy viewed from the movable body, and is calculated on the basis of surrounding brightness, the presence or absence of an obstacle that reduces visibility, or the like.

If the contact possibility and the surrounding visibility are calculated, it is determined on the basis of those values whether or not the movable body is the object (i.e. the movable body whose attention is to be called). Specifically, if the contact possibility is greater than or equal to a predetermined first threshold value, it is determined that some action needs to be taken to avoid the contact with the movable body, and it is determined that the movable body is the object. Alternatively, if the surrounding visibility is less than a predetermined second threshold value, it is determined that the driver of the self-vehicle does not recognize the presence of the movable body, or it is determined that the movable body does not recognize the presence of the self-vehicle, and it is determined that the moveable body is the object.

The contact possibility and the surrounding visibility described above are merely one example. Another determination criterion may be used to determine whether or not the movable body is the object.

If it is determined on the illumination object determinator 220 that the movable body is not the object (i.e. there is no need to call attention) (the step S103:NO), the subsequent process operations are omitted, and a series of process operations is ended. On the other hand, if it is determined that the movable body is the object (i.e. there is a need to call attention) (the step S103:YES), the information about the object (e.g. an attribute, a position, a moving direction, a moving speed or the like of the movable body determined to be the object) is outputted to the illumination pattern generator 230 from the illumination object determinator 220.

On the illumination pattern generator 230, the illumination pattern including the first information, which is to be presented to the driver of the self-vehicle, and the second information, which is to be presented to the object, is generated (step S104). In other words, on the illumination pattern generator 230, one illumination pattern including two different types of information is generated.

The illumination pattern generated in this manner is visualized as a pattern indicating the first information when viewed from a viewpoint of the driver of the self-vehicle, and is visualized as a pattern indicating the second information when viewed from a viewpoint of the object. In other words, the illumination pattern is generated as a pattern whose meaning varies depending on a viewing position or direction. The illumination pattern generator 230, for example, selects an appropriate pattern according to the first information and the second information to be presented, from among the plurality of patterns stored in advance, thereby generating the illumination pattern.

When the illumination pattern is generated, a positional relation between the self-vehicle and the object may be used to make the first information and the second information appropriate. The positional relation is information calculated from the surrounding environment information obtained by the surrounding environment information acquirer 210, and takes into account a distance, a moving direction, a moving speed or the like between the vehicle and the object. In addition to or instead of the positional relation, information about the attribute of the object (e.g. whether the object is a pedestrian or a vehicle) may be used.

Alternatively, when the illumination pattern is generated, the contact possibility and the surrounding visibility used to determine whether or not the movable body is the object may be used. Specifically, a first illumination pattern may be selected if the contact possibility (or the surrounding visibility) is greater than a predetermined threshold value, and a second illumination pattern may be selected if the contact possibility (or the surrounding visibility) is less than a predetermined threshold value.

One example of the first information is, for example, information about the object. One example of the information about the object is information for notifying the driver of the presence of the object, information indicating the attribute of the object, information indicating the moving direction of the object, or the like.

Moreover, one example of the second information is, for example, information about the self-vehicle. One example of the information about the self-vehicle is information for notifying the object of the presence or approach of the self-vehicle, information indicating an approaching direction of the self-vehicle, or the like.

Each of the first information and the second information may include a plurality of pieces of information. If each of the first information and the second information may include a plurality of pieces of information, a combination of a plurality of patterns having different pieces of information may be used as the illumination pattern to be applied.

If the illumination pattern is generated, light according to the illumination pattern is applied by the illuminator 300, and the illumination pattern is projected in a position that can be visually recognized by each of the driver of the self-vehicle and the object (step S105). A projection position of the illumination pattern may be changed, as occasion demands, in accordance with the movement of the self-vehicle or the object. In other words, in order to be displayed in a position that can be always visually recognized by each of the driver of the self-vehicle and the object, the projection position may be changed in accordance with the movement of the self-vehicle or the object.

<Illumination Example to Pedestrian>

Figure 3:
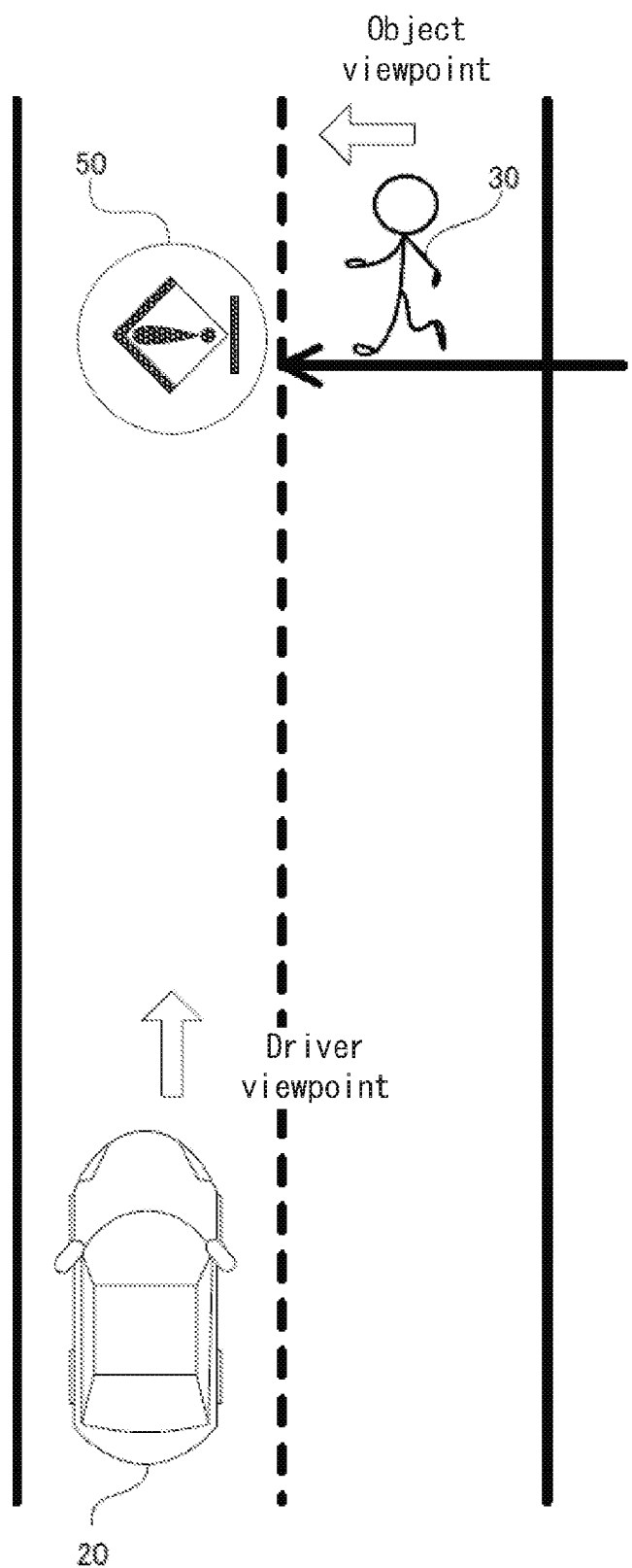
FIG. 3 is a top view illustrating a specific example in which an illumination pattern is applied toward a pedestrian.
Figure 4:
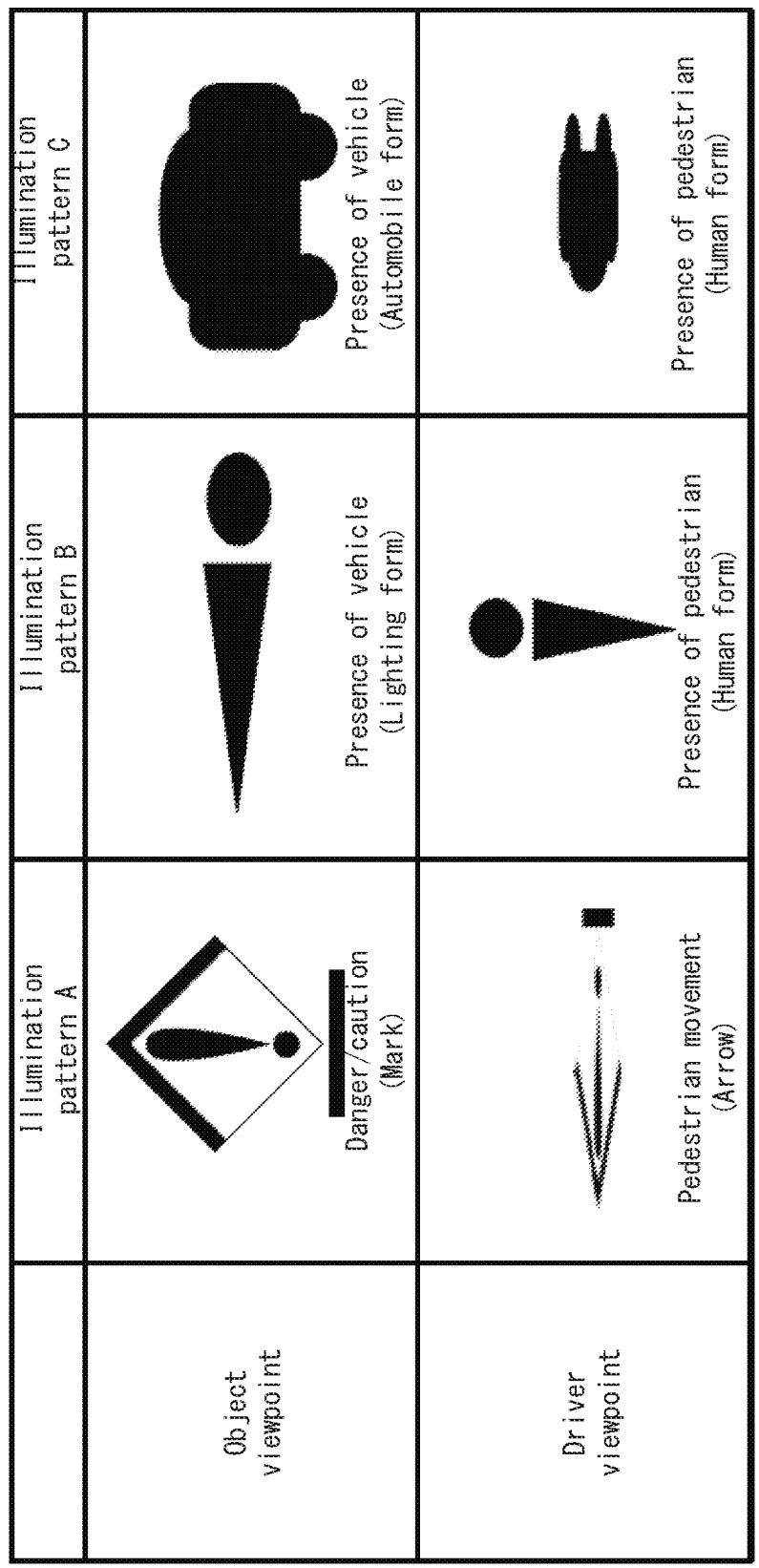
FIG. 4 is a chart illustrating specific examples of the illumination pattern targeted for the pedestrian.

Hereinafter, an example in which the aforementioned illumination pattern is applied toward a pedestrian will be specifically explained with reference to FIG. 3 and FIG. 4. FIG. 3 is a top view illustrating a specific example in which the illumination pattern is applied toward the pedestrian. FIG. 4 is a chart illustrating specific examples of the illumination pattern targeted for the pedestrian.

As illustrated in FIG. 3, it is assumed that a pedestrian 30 is about to cross a road ahead of a moving self-vehicle 20. In this situation, if the pedestrian 30 keeps crossing the road, the self-vehicle 20 approaches the pedestrian 30 so close that it is dangerous. Thus, the self-vehicle 20 applies light to a front position of the pedestrian 30 and projects an illumination pattern 50.

As illustrated in FIG. 4, a shape of the illumination pattern 50 viewed from a viewpoint of the pedestrian 30 is different from a shape viewed from a viewpoint of the self-vehicle 20. This is because the pedestrian 30 and a driver of the self-vehicle 20 have different distances to the illumination pattern, and different viewpoint heights and directions. Specifically, when viewed from the driver of the self-vehicle 20 having a long distance to the illumination pattern 50, the illumination pattern 50 is visualized as having a compressed shape, in comparison with the case of the pedestrian 30 having a short distance to the illumination pattern 50.

Moreover, when viewed from the driver of the self-vehicle 20, the illumination pattern 50 is visualized as being rotated to left by 90 degrees, due to a difference in a viewpoint direction from the pedestrian 30.

If an illumination pattern A is projected at the feet of the pedestrian 30, a pattern including an "exclamation mark" is visualized by the pedestrian 30. Such a pattern is generally well known as a mark meaning "danger" and "caution". It is thus expected that the pedestrian 30 who has visually recognized the illumination pattern A calls attention to the surroundings. On the other hand, the pattern is visualized as a mark indicating an arrow (i.e. a "pedestrian movement") because only a thick line part of the illumination pattern A is emphasized, or only the thick line part is visually recognized. As a result, it is expected that the driver of the self-vehicle 20 recognizes that something (e.g. a pedestrian or another vehicle) is going to move in a direction of the arrow. Regarding the illumination pattern A, the "danger/caution" is one specific example of the "second information", and the "pedestrian movement" is one specific example of the "first information".

If an illumination pattern B is projected at the feet of the pedestrian 30, a lighting-form mark (i.e. a mark in a shape that looks like light applied from the left to the right in FIG. 4) is visualized by the pedestrian 30. It is thus expected that the pedestrian 30 recognizes the "presence of the vehicle" in the left direction viewed from the pedestrian 30. On the other hand, the lighting-form mark is compressed and is visualized as a human-form mark by the driver of the self-vehicle 20. It is thus expected that the driver of the self-vehicle 20 recognizes the "presence of the pedestrian" around an area in which the illumination pattern B is projected. With respect to the illumination pattern B, the "presence of the vehicle" is one specific example of the "second information" and the "presence of the pedestrian" is one specific example of the "first information".

If an illumination pattern C is projected at the feet of the pedestrian 30, an automobile-form mark is visualized by the pedestrian 30. It is thus expected that the pedestrian 30 recognizes the "presence of the vehicle" around the pedestrian 30. On the other hand, the automobile-form mark is compressed and is visualized as a human-form mark by the driver of the self-vehicle 20. It is thus expected that the driver of the self-vehicle 20 recognizes the "presence of the pedestrian" around an area in which the illumination pattern C is projected. With respect to the illumination pattern C, the "presence of the vehicle" is one specific example of the "second information" and the "presence of the pedestrian" is one specific example of the "first information".

The illumination patterns A to C are merely one example. Any pattern that can present different pieces of information depending on a viewpoint difference can be used as the illumination pattern 50 according to the embodiment.

<Illumination Example in Presence of Obstacle>

Figure 5:
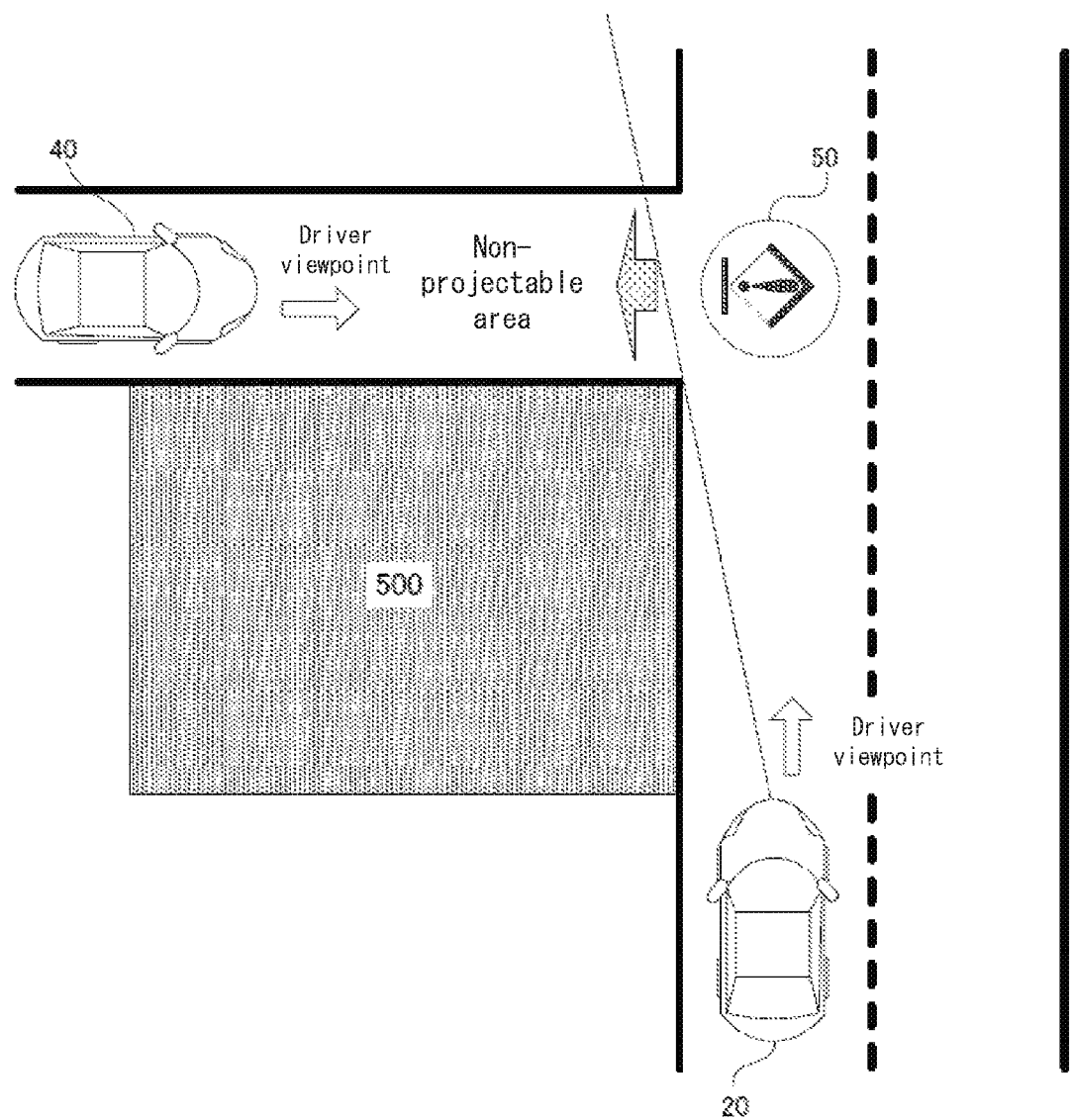
FIG. 5 is a top view illustrating a specific example in which the illumination pattern is applied toward another vehicle.

Hereinafter, an illumination example if there is an obstacle between the self-vehicle and the object will be specifically explained with reference to FIG. 5. FIG. 5 is a top view illustrating a specific example in which the illumination pattern is applied toward another vehicle.

It is assumed, as illustrated in FIG. 5, that there is a building 500 between the self-vehicle 20 and another vehicle 40. In this situation, the driver of the self-vehicle 20 and a driver of the other vehicle 40 cannot visually recognize each other because the building 500 becomes an obstacle. Thus, it can be said that this is a situation to call attention.

There is also a possibility that the presence of the other vehicle 40 cannot be recognized by the self-vehicle 20 due to the presence of the building 500. In other words, there is a possibility that the other vehicle 40 cannot be detected by the in-vehicle camera 110, the radar 120, or the like. In case that it happens, it is desirable that the vehicular lighting apparatus 10 is configured to recognize the object, such as the other vehicle 40 that cannot be visually recognized, by using vehicle-to-vehicle communication of the communication apparatus 130, or by other means.

If there is the building 500 between the self-vehicle 20 and the other vehicle 40, the building 500 becomes the obstacle, which causes a not-projectable area in which the illumination pattern 50 cannot be projected from the self-vehicle 20. Thus, the illumination pattern 50 cannot be projected just ahead of the other vehicle 40.

In the situation illustrated in FIG. 5, the illumination pattern 50 may be projected in an area near an intersection in which light can be applied from the self-vehicle 20. In other words, the illumination pattern 50 may be projected not in front of the other vehicle 40 but also in a slightly distant position. In this manner, the illumination pattern 50 can be visualized by the driver of the self-vehicle 20 and the driver of the other vehicle 40.

If the other vehicle 40 is running at a relatively high speed, the visibility can be increased if the illumination pattern 50 is projected in the slightly distant position. As described above, the projection position of the illumination pattern 50 may be changed in view of the moving speed of the object (or the self-vehicle 20). In this case, for the moving speed, the information obtained as the surrounding environment information may be used.

If the projection position of the illumination pattern is changed, the distances to the illumination pattern 50 from the driver of the self-vehicle 20 and from the object are changed. Thus, the views of the illumination pattern 50 from the driver of the self-vehicle 20 and from the object are also changed. Thus, if the projection position of the illumination pattern is changed, it is desirable that the shape of the illumination pattern 50 is adjusted to an appropriate shape.

Figure 6:
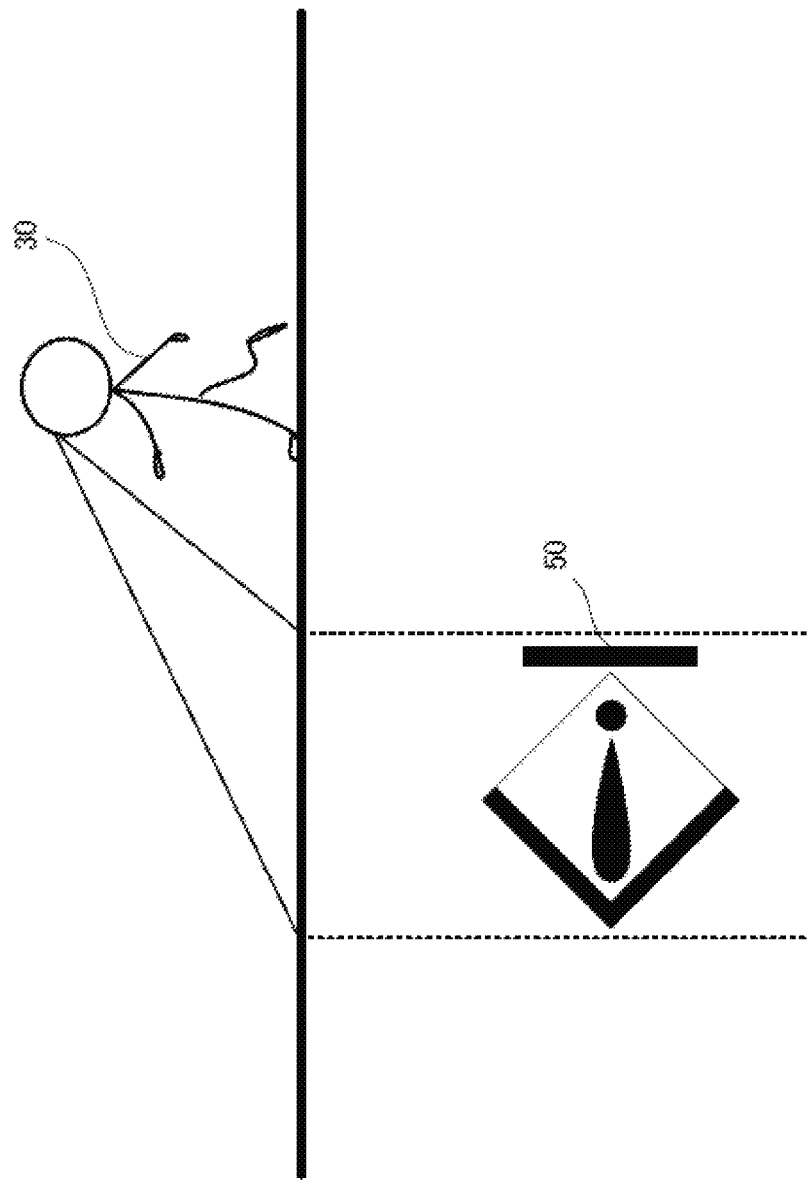
FIG. 6 is a side view illustrating one example of the illumination pattern presented to the pedestrian.
Figure 7:
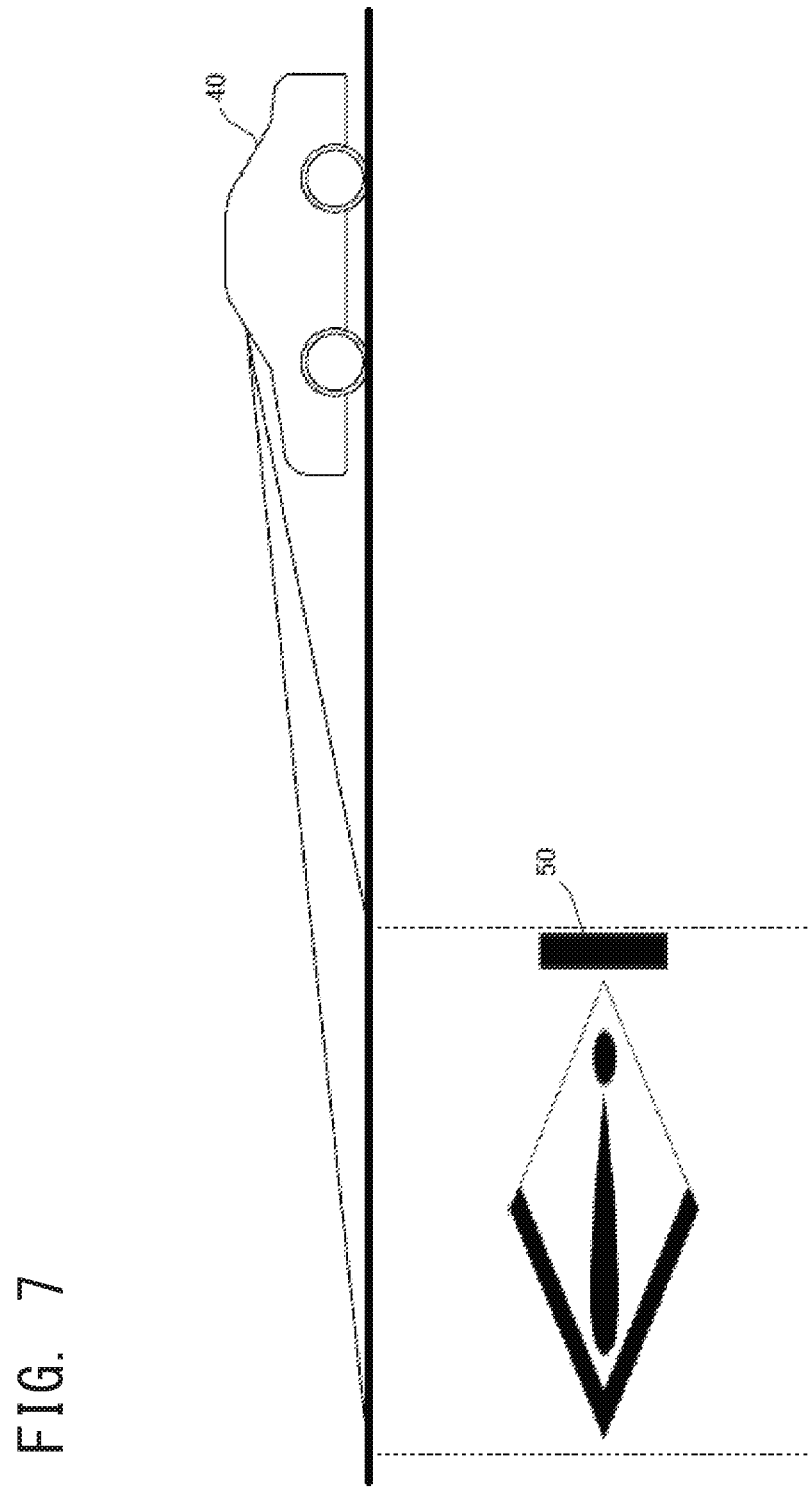
FIG. 7 is a side view illustrating one example of the illumination pattern presented to the other vehicle.

Hereinafter, a method of adjusting the shape of the illumination pattern 50 will be specifically explained with reference to FIG. 6 and FIG. 7. FIG. 6 is a side view illustrating one example of the illumination pattern presented to the pedestrian. FIG. 7 is a side view illustrating one example of the illumination pattern presented to the other vehicle.

As illustrated in FIG. 6, if the object is the pedestrian 30, its moving speed is estimated to be relatively low. It is thus desirable to set the projection position of the illumination pattern 50 to be close to the pedestrian 30. If the illumination pattern 50 is projected near the pedestrian 30, the illumination pattern 50 is visualized by the pedestrian 30 to have a shape similar to a projected shape. Thus, if the illumination pattern 50 in a shape that is desired to be visualized by the pedestrian 30 is projected as it is, appropriate information can be presented.

As illustrated in FIG. 7, if the object is the other vehicle 40, its moving speed is estimated to be relatively high. It is thus desirable to set the projection position of the illumination pattern 50 to be slightly distant from the other vehicle 40. If the illumination pattern 50 is projected in a position distant from the other vehicle 40, the projected illumination pattern 50 is visualized by the driver of the other vehicle 40 to have a compressed shape in a visual line direction. Thus, if the illumination pattern 50 in a shape that is extended in advance in the visual line direction of the object is projected, appropriate information can be presented.

As illustrated in FIG. 6 and FIG. 7, if the shape of the illumination pattern 50 is changed on the basis of the distance from the object, the shape when viewed from the driver of the self-vehicle 20 is also changed. Thus, if the shape of the illumination pattern 50 is changed and adjusted, the shape when viewed from the driver of the self-vehicle 20 also needs to be considered. In the examples illustrated in FIG. 6 and FIG. 7 (i.e. in the illumination pattern A in FIG. 4), even if the illumination pattern 50 is compressed or extended in the visual line direction of the object, only a length of the arrow is changed from the viewpoint of the driver of the self-vehicle 20. Thus, there is no detrimental effect even if the shape of the illumination pattern 50 is changed.

The projection position of the illumination pattern 50 may be changed in view of the moving speed of the object (or the self-vehicle 20) not only when there is the obstacle between the self-vehicle and the object, but also when there is no obstacle between the self-vehicle and the object. Moreover, the shape of the illumination pattern 50 may be adjusted to be an appropriate shape if the projection position of the illumination pattern is changed, not only when there is the obstacle between the self-vehicle and the object, but also when there is no obstacle between the self-vehicle and the object.

<Effects of Embodiment>

Lastly, beneficial technical effects achieved by the vehicular lighting apparatus 10 according to the embodiment will be explained.

As explained with reference to FIG. 1 to FIG. 7, according to the vehicular lighting apparatus 10 in the embodiment, if there is the object (i.e. the pedestrian 30 and the other vehicle 40) whose attention is to be called around the self-vehicle 20, the illumination pattern 50 is projected in a position that can be visually recognized by the driver of the self-vehicle 20 and the object. Then, in particular, the illumination pattern 50 is generated as the pattern indicating the different pieces of information (i.e. the first information and the second information) depending on the viewpoint difference. Thus, the information obtained by the driver of the self-vehicle 20 visualizing the illumination pattern 50 is different from the information obtained by the object visualizing the illumination pattern 50. Therefore, the different pieces of information can be presented to the driver of the self-vehicle 20 and the object by using the common illumination pattern (i.e. common light). As a result, it is possible to call the object's attention and to notify the driver of the self-vehicle 20 of the presence of the object or the like, at the same time, by using the common illumination light.

Moreover, the illumination pattern 50 is configured to present the different pieces of information by using the change in shape caused by the viewpoint difference between the driver of the self-vehicle 20 and the object. Thus, information can be presented, in a shape that is easy to understand by intuition, to each of the driver of the self-vehicle 20 and the object. For example, if the object's attention is to be called by the object visualizing an abstract mark that has no meaning of calling attention, the effects of calling attention cannot be obtained if the object does not have knowledge about the mark. According to the illumination pattern 50 in the embodiment, however, the object's attention can be called by using the mark whose meaning can be understood by the object by intuition (e.g. refer to the specific example in FIG. 4). It is thus possible to certainly call the object's attention even if the object does not have special knowledge about the illumination pattern 50.

The aforementioned embodiment explains the example in which the illumination pattern including the information to be presented to the driver of the self-vehicle 20 and the object is generated by being selected from a plurality of patterns. There may be one illumination pattern generated by the illumination pattern generator 230. In other words, if the movable body is determined to be the object, the same illumination pattern may be always projected, regardless of the positional relation between the self-vehicle 20 and the object, or the like. Even in such a case, the different pieces of information can be presented to the driver of the self-vehicle 20 and the object, by using the common illumination pattern. It is therefore possible to call the object's attention and to notify the driver of the self-vehicle 20 of the presence of the object, or the like, at the same time.

The invention may be embodied in other specific forms without departing from the spirit or essential characteristics thereof. The present embodiments and examples are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A vehicular lighting apparatus comprising:
    a detector configured to detect a movable body around a self-vehicle;
    a deteminator configured to determine whether or not the movable body is an object whose attention is to be called; and
    a projector configured to project predetermined visual information by using illumination light in a predetermined range around the object if it is determined by said determinator that the movable body is the object, wherein
    the predetermined visual information includes first information, which is to be presented to a driver of the self-vehicle, and second information, which is to be presented to the object, and the predetermined visual information is visualized as the first information by the driver of the self-vehicle and is visualized as the second information by the object, depending on a viewpoint difference between the driver of the self-vehicle and the object.

2. The vehicular lighting apparatus according to claim 1, wherein said determinator is configured to determine whether or not the movable body is the object, on the basis of contact possibility between the self-vehicle and the movable body, and surrounding visibility of the movable body.

3. The vehicular lighting apparatus according to claim 1, wherein said projector is configured to project the predetermined visual information and then to change a position of projection of the predetermined visual information in accordance with movement of the self-vehicle and the object.

4. The vehicular lighting apparatus according to claim 1, wherein
    the first information is information indicating at least one of presence of the object, an attribute of the object, and a moving direction of the object with respect to the self-vehicle, and
    the second information is information indicating at least one of presence of the self-vehicle, an approaching direction of the self-vehicle with respect to the object, and call for attention to the self-vehicle.

5. The vehicular lighting apparatus according to claim 2, wherein said projector is configured to project the predetermined visual information and then to change a position of projection of the predetermined visual information in accordance with movement of the self-vehicle and the object.

6. The vehicular lighting apparatus according to claim 2, wherein
    the first information is information indicating at least one of presence of the object, an attribute of the object, and a moving direction of the object with respect to the self-vehicle, and
    the second information is information indicating at least one of presence of the self-vehicle, an approaching direction of the self-vehicle with respect to the object, and call for attention to the self-vehicle.

* * * * *